US008480761B2

(12) United States Patent
Wood et al.

(10) Patent No.: US 8,480,761 B2
(45) Date of Patent: Jul. 9, 2013

(54) SECURITY ENCLOSURE FOR A ROUTER

(75) Inventors: Steven Wood, Boise, ID (US); David Alan Johnson, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 213 days.

(21) Appl. No.: 12/957,158

(22) Filed: Nov. 30, 2010

(65) Prior Publication Data

US 2011/0296537 A1 Dec. 1, 2011

Related U.S. Application Data

(60) Provisional application No. 61/266,942, filed on Dec. 4, 2009.

(51) Int. Cl.
*G06F 21/00* (2006.01)
(52) U.S. Cl.
USPC .......................................................... 726/35
(58) Field of Classification Search
USPC .......................................................... 726/35
See application file for complete search history.

(56) References Cited

U.S. PATENT DOCUMENTS

| 5,220,815 | A  | * | 6/1993  | Davidge et al. .................. 70/14 |
|-----------|----|---|---------|---------------------------------|
| D416,857  | S  | * | 11/1999 | Gauld et al. .................. D13/103 |
| 7,156,674 | B1 | * | 1/2007  | Frank ........................... 439/133 |
| 7,372,705 | B1 | * | 5/2008  | Spivey et al. .................. 361/796 |
| 8,125,965 | B1 | * | 2/2012  | Vaccaro et al. ................. 370/338 |
| 2002/0002061 | A1 | * | 1/2002 | Miyasaka et al. ............ 455/557 |
| 2004/0085713 | A1 | * | 5/2004 | Pols Sandhu et al. ........ 361/679 |
| 2005/0036622 | A1 | * | 2/2005 | Hay et al. .................... 380/270 |
| 2005/0058142 | A1 | * | 3/2005 | Lee et al. .................... 370/401 |
| 2005/0095885 | A1 | * | 5/2005 | Lindner ...................... 439/133 |
| 2005/0213295 | A1 | * | 9/2005 | Perez et al. .................. 361/683 |
| 2005/0215194 | A1 | * | 9/2005 | Boling et al. ................ 455/3.02 |
| 2005/0238088 | A1 | * | 10/2005 | Piepmeyer et al. .......... 375/222 |
| 2009/0255725 | A1 | * | 10/2009 | Curtis ........................ 174/535 |
| 2009/0268650 | A1 | * | 10/2009 | Grondzik .................... 370/310 |

* cited by examiner

*Primary Examiner* — Michael Pyzocha
(74) *Attorney, Agent, or Firm* — Parsons Behle & Latimer

(57) ABSTRACT

A router comprises a local network interface and routing services. The router also includes a data exchanger interface that can be configured to connect to a data exchanger. A security enclosure is configured to cover the data exchanger when the data exchanger is connected to the data exchanger interface.

22 Claims, 4 Drawing Sheets

SECURITY ENCLOSURE FOR A ROUTER

The present disclosure claims priority to U.S. Provisional Application No. 61/266,942, filed on Dec. 4, 2009, the disclosure of which is hereby incorporated by reference in its entirety.

BACKGROUND

Routers allow client devices in a local area network (LAN) to access a wide area network (WAN). Connections between client devices and the router may be wired or wireless. Similarly, connections between the router and the Wide Area Network may be wired or wireless. Wireless connections to the WAN may be through a cellular network. A data exchanger may be used by the router to wirelessly contact a wide area network. The data exchanger may take the form of a separate device card that can be inserted into a slot provided by the router, or the data exchanger may be otherwise connected to the router through an I/O port.

Routers often are located in publicly accessible areas, or in other areas where it is desirable to protect the routers or router components. In some situations, routers may be securely mounted to a wall or other location to prevent unauthorized people from removing the router from its designated location.

While the router may be securely attached to a certain location, or otherwise may be positioned in a location where the router itself is deemed safe, the data exchanger may be in an unprotected state, allowing unauthorized persons to tamper with, damage or steal the data exchanger.

SUMMARY

An embodiment of the present disclosure is directed to a router. The router comprises a local network interface; routing services; a data exchanger interface configured to connect to a data exchanger; and a security enclosure configured to cover said data exchanger when the data exchanger is connected to the data exchanger interface.

Another embodiment of the present application is directed to a router. The router comprises a local network interface; routing services; a data exchanger interface; a data exchanger connected to the data exchanger interface; and a security enclosure covering the data exchanger.

Yet another embodiment of the present application is directed to a method of protecting a data exchanger connected to a router. The method comprises connecting the data exchanger to a data exchanger interface of a router. A security enclosure is attached to the router in a manner that protects the data exchanger from unauthorized access.

Figure 1:
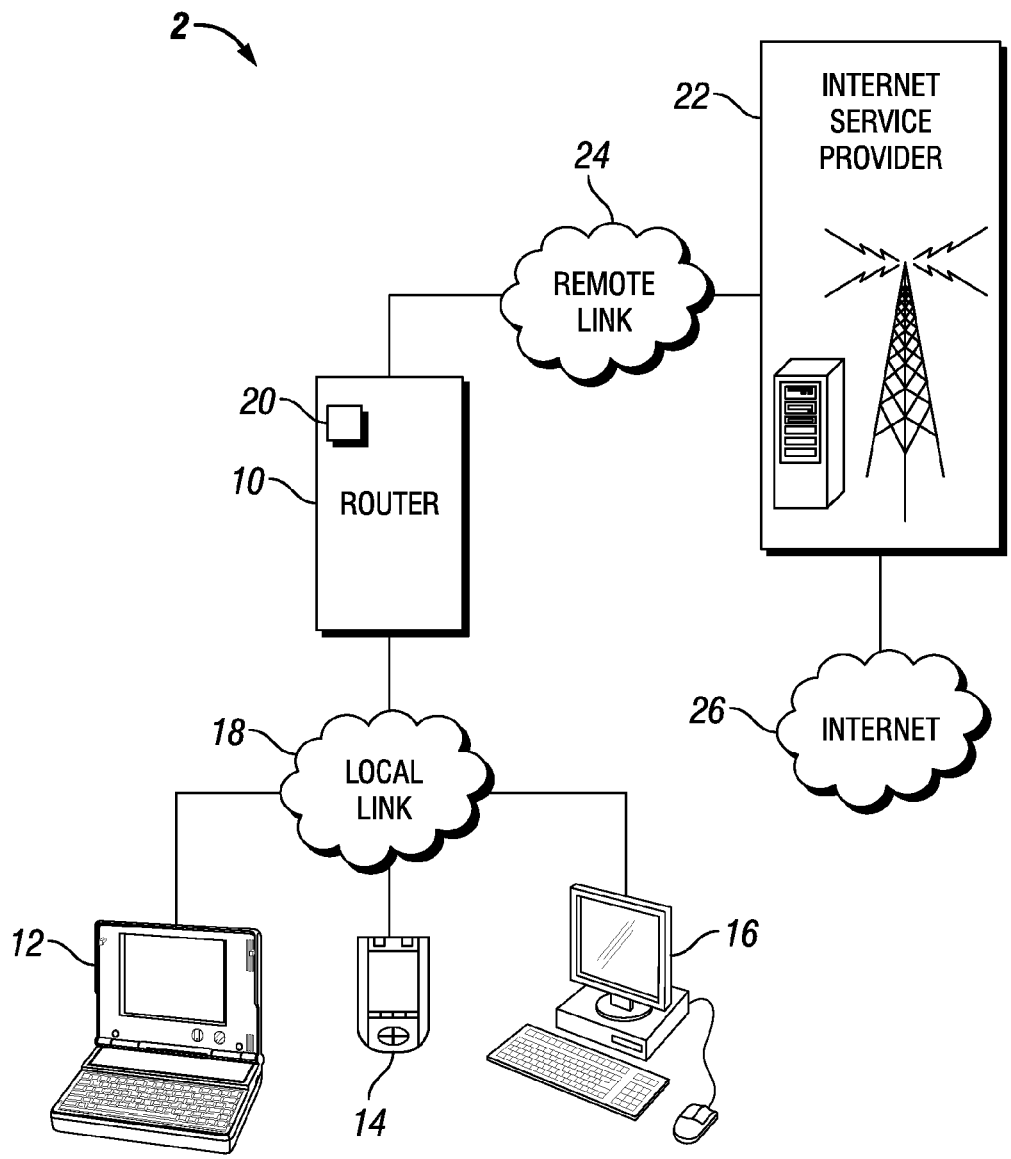
FIG. 1 is a block diagram of a system comprising a router, according to an embodiment of the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

Embodiments of the present disclosure allow a user to connect to the internet using a device such as a wireless modem or other cellular data access device. With a router, multiple users of computing devices such as lap top computers, desktop computers, and personal digital assistants (PDAs) can access the internet simultaneously through the data capabilities of the cellular data access device. The combination of the router and the cellular data access device can provide an internet-connected local wireless network anywhere that there is cellular data coverage.

FIG. 1 illustrates an exemplary environment in which various embodiments of the present disclosure may be implemented. The environment may comprise a router 10, client devices 12, 14, and 16 and local link 18. Router 10, discussed in more detail later, represents generally a device capable of routing network communications between client devices 12, 14, and 16 and internet 26 via a data exchanger 20. Client devices 12, 14, and 16 represent generally any computing devices capable of communicating with router 10.

Local link 18 interconnects router 10 and client devices 12, 14, 16. Local link 18 represents generally a cable, wireless, or remote link via a telecommunication link, an infrared link, a radio frequency link, or any other connector or system that provides electronic communication between devices 10, 12, 14, and 16. The path followed by link 18 between devices 10, 12, 14, and 16 in the schematic view of FIG. 1 represents the logical communication path between these devices, not necessarily the physical path between the devices. Devices 10, 12, 14, and 16 can be connected at any point and the appropriate communication path established logically between the devices.

Router 10 can be designed to incorporate a data exchanger 20. Data exchanger 20 represents generally any combination of hardware and/or programming that can be utilized by router 10 to connect to a remote network such as the internet. In an embodiment, the data exchanger may take the form of a separate device card that can be inserted into a slot provided by router 10, or otherwise connected to the router 10 through, for example, an I/O port. The data exchanger can be any type of modem that is capable of being received by the router 10 and that can provide the desired connection to the remote network. Examples of suitable data exchangers include cellular data modems, DSL modems or cable modems.

A service provider 22 represents generally any infrastructure configured to provide internet related data services to subscribers such as an owner of data exchanger 20. For example, where data exchanger 20 is a cellular modem, service provider 22 may be a cellular telephone service provider capable of providing voice and data services to subscribers allowing access to internet 26. Where data exchanger 20 is a DSL or cable modem, service provider 22 may be a more traditional internet service provider (ISP) providing data access to internet 26 through wired means.

A remote link 24 interconnects data exchanger 20 and service provider 22 and represents generally any combination of a cable, wireless, or remote connection via a telecommunication link, an infrared link, a radio frequency link, or any other connector or system that provides electronic communication between data exchanger 20 and service provider 22. Remote link 24 may represent an intranet, an internet, or a combination of both.

Figure 2:
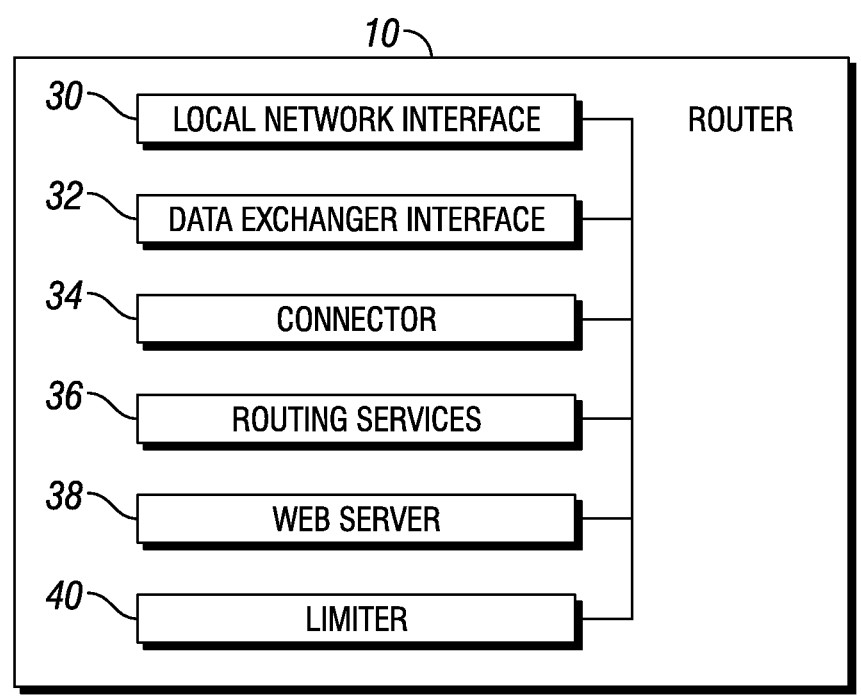
FIG. 2 is a block diagram showing physical and logical components of a router, according to an embodiment of the present disclosure.

FIG. 2 is a block diagram illustrating exemplary physical and logical components of router 10. As described above, router 10 represents generally any combination of hardware and/or programming capable functioning as a router for directing network communications between client devices on the local network, or between client devices and the internet via data exchanger 20.

In the example of FIG. 2, router 10 includes local network interface 30 and data exchanger interface 32. Local network interface 30 represents generally any combination of hardware and/or program instructions capable of supplying a communication interface between router 10 and client devices 12, 14, and 16 shown in FIG. 1. Data exchanger interface 32 represents any combination of hardware and/or programming enabling data to be communicated between router 10 and a data exchanger 20 shown in FIG. 1. For example, interface 30 may include a transceiver operable to exchange network communications utilizing a wireless protocol such as ultrawideband (UWB), Bluetooth, or 802.11. Other examples of interfaces 30 and 32 include physical ports or other physical connection points enabling wired communication, such as USB ports, Ethernet ports, and Firewire ports. The data exchanger interface 32 could also be, for example, a slot for a device card, such as PCMCIA or ExpressCard, as will be discussed in greater detail below.

Router 10 also includes routing services 36 and web server 38. Routing services 36 represent generally any combination of hardware and/or programming for routing network communication received through local network interface 30 to be transmitted by data exchanger 20 to internet 26. Routing services 36 is also responsible for routing inbound network communications received from internet 26 and directed via local network interface 30 to a specified client device 12, 14, or 16. Outbound and inbound network communications, for example can be IP (internet protocol) packets directed to a target on internet 26 or to a particular network device 12, 14, or 16 on a local area network.

Web server 38 represents generally any combination of hardware and/or programming capable of serving interfaces such as web pages to client devices 12, 14, and 16. Such web pages may include web pages that when displayed by a network device allows a user to provide or otherwise select settings related to the operation of router 10.

Router 10 can optionally include a connector 34. Connector 34 represents generally any combination of hardware and/or programming for sending a signal to data exchanger 20 to establish a data connection with service provider 22 so that access can be made to internet 26. For example, where a data exchanger 20 is a cellular modem, connector 34 may send a signal causing the cellular modem to establish such a data link with service provider 22. In an embodiment, the router does not include a connector 34. In an embodiment, the hardware and/or programming for establishing a data connection with service provider 22 is included in the cellular modem.

The router 10 can optionally include a limiter 40. Limiter 40 represents generally any combination of hardware and/or programming capable of distinguishing among the users of devices such as client devices 12, 14, and 16, and applying different internet access rules for different users. For example, certain internet access rules may apply to the owner of router 10. In this context, the term owner refers to an individual or entity that is a subscriber with respect to a service provider such as service provider 22 shown in FIG. 1. The owner typically has physical possession or otherwise has control of router 10. Other internet access rules can apply to users authorized by the owner. Yet other internet access rules apply to anonymous users. Where local network interface 30 provides for a wireless connection with client devices, a user of a particular client device might not be known by the owner. As such, internet access rules for such users may be quite limiting. The limiter 40 and operation thereof is discussed in greater detail in U.S. patent application Ser. No. 11/673,956, filed Feb. 12, 2007, in the name of Pat Sewall et al., the disclosure of which is hereby incorporated by reference in its entirety. In an alternative embodiment, router 10 does not include a limiter 40.

Figure 3A:
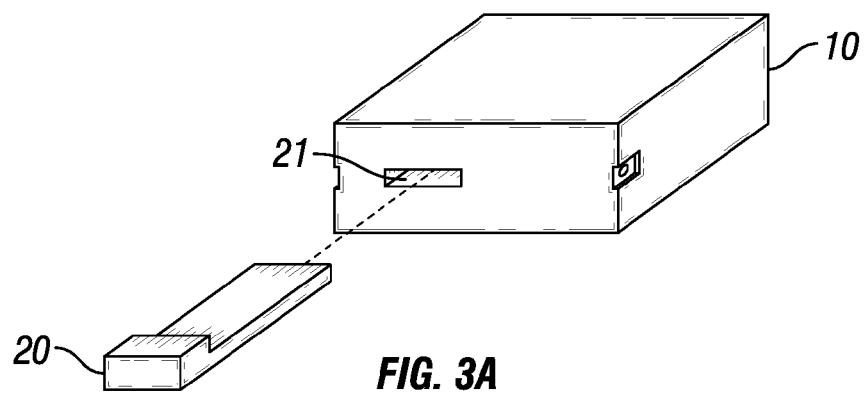
FIGS. 3A to 3C illustrate a method comprising connecting a data exchanger to a data exchanger interface of a router, and attaching a security enclosure to the router in a manner that protects the data exchanger from unauthorized access, according to an embodiment of the present disclosure.

In an embodiment, router 10 may be located in a publicly accessible area. For example, router 10 may be securely mounted to a wall or other location, to prevent unauthorized people from removing the router from its designated location. As described previously, the data exchanger 20 may take the form of a separate device card that can be inserted into a slot provided by router 10, or otherwise connected to the router 10 through an I/O port. One such example is illustrated in FIG. 3A, where the data exchanger 20 is inserted into a slot 21 located in router 10. While the router 10 may be securely attached to a certain location, the data exchanger 20 is in an unprotected state, allowing unauthorized persons to tamper with, damage or steal the data exchanger 20.

Figure 3B:
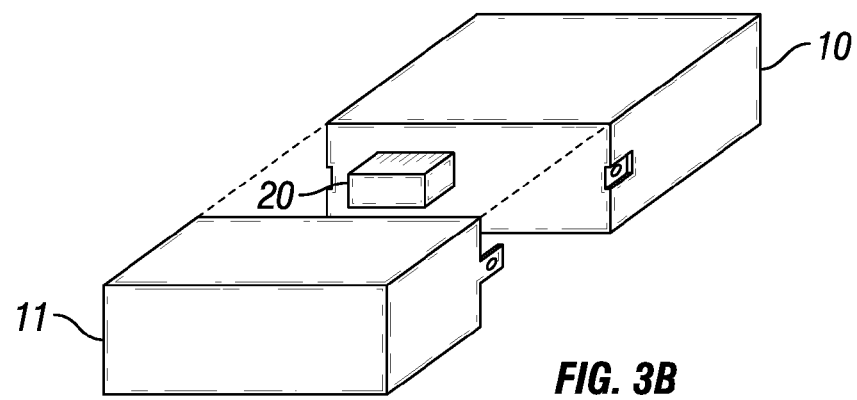
Figure 3C:
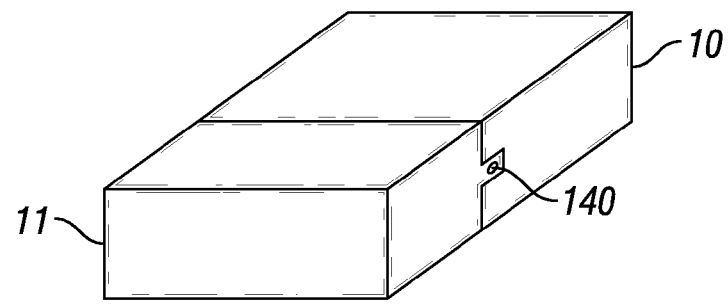
Figure 5:
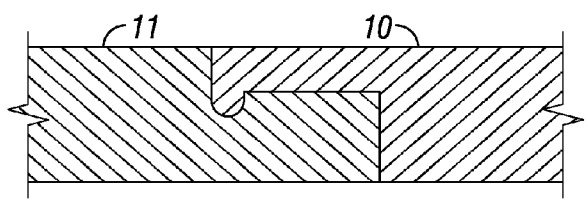
FIG. 5 is a schematic drawing of a security enclosure attached to a portion of a router, according to an embodiment of the present disclosure.

To discourage or prevent these unauthorized actions, a security enclosure 11 (FIG. 3B) is designed to mate securely to router 10. When attached to router 10, the security enclosure 11 covers the data exchanger 20, preventing unauthorized persons from accessing the data exchanger 20. Security enclosure 11 can be attached to the router in any suitable manner. For example, security enclosure 11 may snap fit or overlap with a portion of the router 10, as shown in FIG. 5. Additional or alternative attachment features may include, for example, a flange and screw system 140 shown in FIG. 3C to affix the security enclosure 11 to the router 10, while also providing protection from tampering. Any other suitable attaching means could also be employed in place of those listed above.

Figure 4:
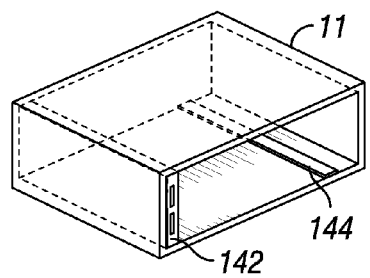
FIG. 4 is a schematic drawing of a security enclosure, according to an embodiment of the present disclosure.

In an embodiment, the security enclosure 11 may incorporate additional attributes that improve the utility of the router 10 or data exchanger 20. For example, as shown in FIG. 4, the security enclosure 11 may include a battery 142 that attaches electrically to the router 10. If desired, the battery 142 can be charged by the router 10 when the router 10 is connected to wired electrical power. The battery 142 provides power to the router 10 if the wired electrical power fails.

In an embodiment, the security enclosure 11 may include an antenna 144 which is attached to the data exchanger 20 to improve the signal reception and transmission of the data exchanger 20. Alternatively, the antenna 144 may attach to the router 10 to improve the signal reception and transmission of the router 10 when communicating wirelessly with, for example, local client devices 12, 14, and 16.

Cables may be used to connect antenna 144 to the router 10, or connect the antenna 144 to the data exchanger 20. Cables may also be used to connect the battery 142 to the router 10.

In an embodiment, the security enclosure 11 may contain the data exchanger 20 that is embedded in or otherwise attached to the security enclosure 11. In this configuration, the person assembling the security enclosure 11 to the router 10 may use a cable (not shown) to create the electrical connection between the data exchanger 20 and the router 10, prior to attaching the security enclosure 11 to the router 10.

Figure 6:
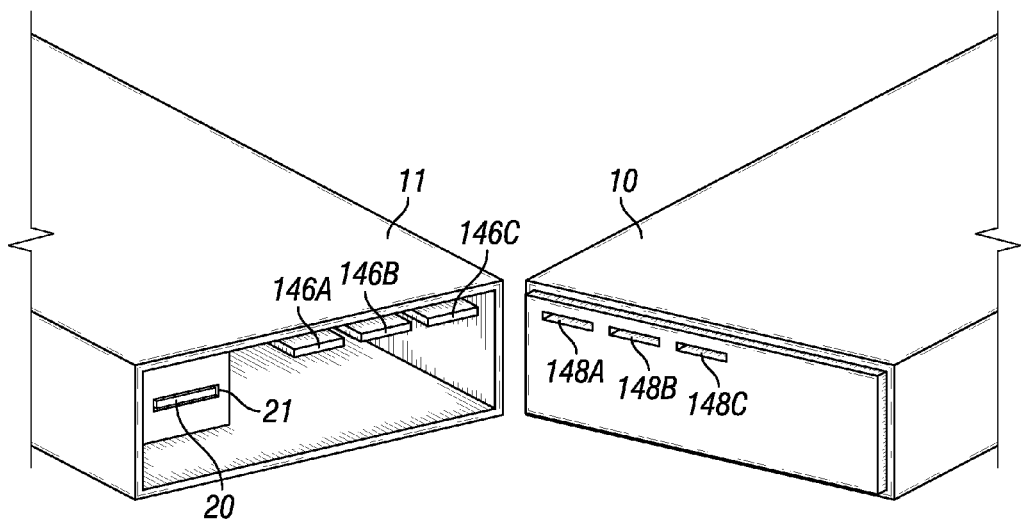
FIG. 6 is a schematic drawing of a security enclosure comprising connections for attaching to a router, according to an embodiment of the present disclosure.

Alternatively, the electrical connection between the router 10 and the antenna 144, or the electrical connections between the router 10 and the battery 142, or the electrical connections between the router 10 and the data exchanger 20 embedded in the security enclosure 11, may be designed such that the connections are made automatically when the security enclosure 11 is attached to the router 10. The connections can be made in any suitable manner. In an embodiment, these connections may be made through traditional electrical connectors, with one set of connectors attached to the security enclosure 11 and a mating set of connectors attached to the router 10, where the connectors are positioned so as to make physical connection as the security enclosure 11 is physically attached to the router 10. For example, as shown in FIG. 6, when security enclosure 11 is attached to router 10, a connector 146A mates with connector 148A, a connector 146B mates with connector 148B, and a connector 146C mates with connector 148C. Any number or type of connections can be employed in place of or in addition to those shown in FIG. 6.

The schematic diagrams of the figures illustrate exemplary environments in which embodiments of the present disclosure may be implemented. Implementation, however, is not limited to these environments. The diagrams of the figures show the architecture, functionality, and operation of various embodiments of the present disclosure. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

The present disclosure has been shown and described with reference to the foregoing exemplary embodiments. It is to be understood, however, that other forms, details and embodiments may be made without departing from the spirit and scope of the disclosure.

What is claimed is:

1. A router, comprising:
a local network interface;
routing services;
a data exchanger interface configured to connect to a data exchanger, the data exchanger configured to connect the router to a remote network, and wherein the data exchanger is a removable communication device; and
a security enclosure configured to cover said data exchanger when the data exchanger is connected to the data exchanger interface, wherein the data exchanger is embedded in, and attached to, the security enclosure.

2. The router of claim 1, wherein the data exchanger interface comprises a slot configured to receive a device card.

3. The router of claim 1, wherein the data exchanger interface comprises an input/output port.

4. The router of claim 1, wherein the security enclosure is configured to overlap with a portion of the router.

5. The router of claim 1, wherein the security enclosure is configured to attach to the router by snap fitting onto the router.

6. The router of claim 1, wherein the security enclosure is configured to attach to the router using a flange.

7. The router of claim 1, wherein the security enclosure comprises a battery configured to provide power to the router.

8. The router of claim 1, wherein the security enclosure comprises an antenna configured to attach to the data exchanger so as to provide improved signal and transmission when communicating with local devices.

9. The router of claim 1, further comprising:
an antenna embedded into the security enclosure and arranged entirely within an interior of the security enclosure;
a battery embedded into the security enclosure and configured to receive a charge when the router is connected to a wired electrical power source, and further configured to provide power for the router in the absence of a wired electrical power source;
wherein the data exchanger, the antenna, and the battery are each configured within the security enclosure to automatically attach to a respective connector of the router when the security enclosure is attached the router.

10. A router, comprising:
a local network interface;
routing services;
a data exchanger interface;
a data exchanger connected to the data exchanger interface and configured to connect the router to a remote network, and wherein the data exchanger is a removable communication device; and
a security enclosure covering the data exchanger, wherein the data exchanger is embedded in, and attached to, the security enclosure.

11. The router of claim 10, wherein the data exchanger interface comprises an input/output port.

12. The router of claim 10, wherein the data exchanger is a device card.

13. The router of claim 10, wherein the data exchanger is a cellular modem.

14. The router of claim 10, wherein the data exchanger is a DSL modem.

15. The router of claim 10, wherein the data exchanger is a cable modem.

16. The router of claim 10, further comprising:
an antenna embedded into the security enclosure and arranged entirely within an interior of the security enclosure;
a battery embedded into the security enclosure and configured to receive a charge when the router is connected to a wired electrical power source, and further configured to provide power for the router in the absence of a wired electrical power source;
wherein the data exchanger, the antenna, and the battery are each configured within the security enclosure to automatically attach to a respective connector of the router when the security enclosure is attached the router.

17. The router of claim 10, further comprising a connector for establishing a data connection with an internet service provider.

18. The router of claim 17, further comprising a limiter.

19. A method of protecting a data exchanger connected to a router, wherein the data exchanger is configured to connect the router to a remote network, and further wherein the data exchanger is a removable communication device, the method comprising:

connecting the data exchanger to a data exchanger interface of a router; and attaching a security enclosure to the router in a manner that protects the data exchanger from unauthorized access, wherein the data exchanger is embedded in, and attached to, the security enclosure.

20. The method of claim 19, wherein the data exchanger is a device card.

21. The method of claim 19, wherein the data exchanger interface is an input/output port.

22. The method of claim 19 further wherein:

attaching the security enclosure further comprises wherein the security enclosure comprises:

a battery embedded into the security enclosure and configured to receive a charge when the router is connected to a wired electrical power source, and further configured to provide power for the router in the absence of a wired electrical power source;

an antenna embedded into the security enclosure and arranged entirely within an interior of the security enclosure; and wherein attaching the security enclosure further comprises attaching the data exchanger, the antenna, and the battery into a respective connector of the router.

* * * * *